Oct. 7, 1941.  A. C. DUNN  2,258,579
ELECTROFORMING METHOD OF MAKING MOLDS
Filed Nov. 20, 1936  4 Sheets-Sheet 1
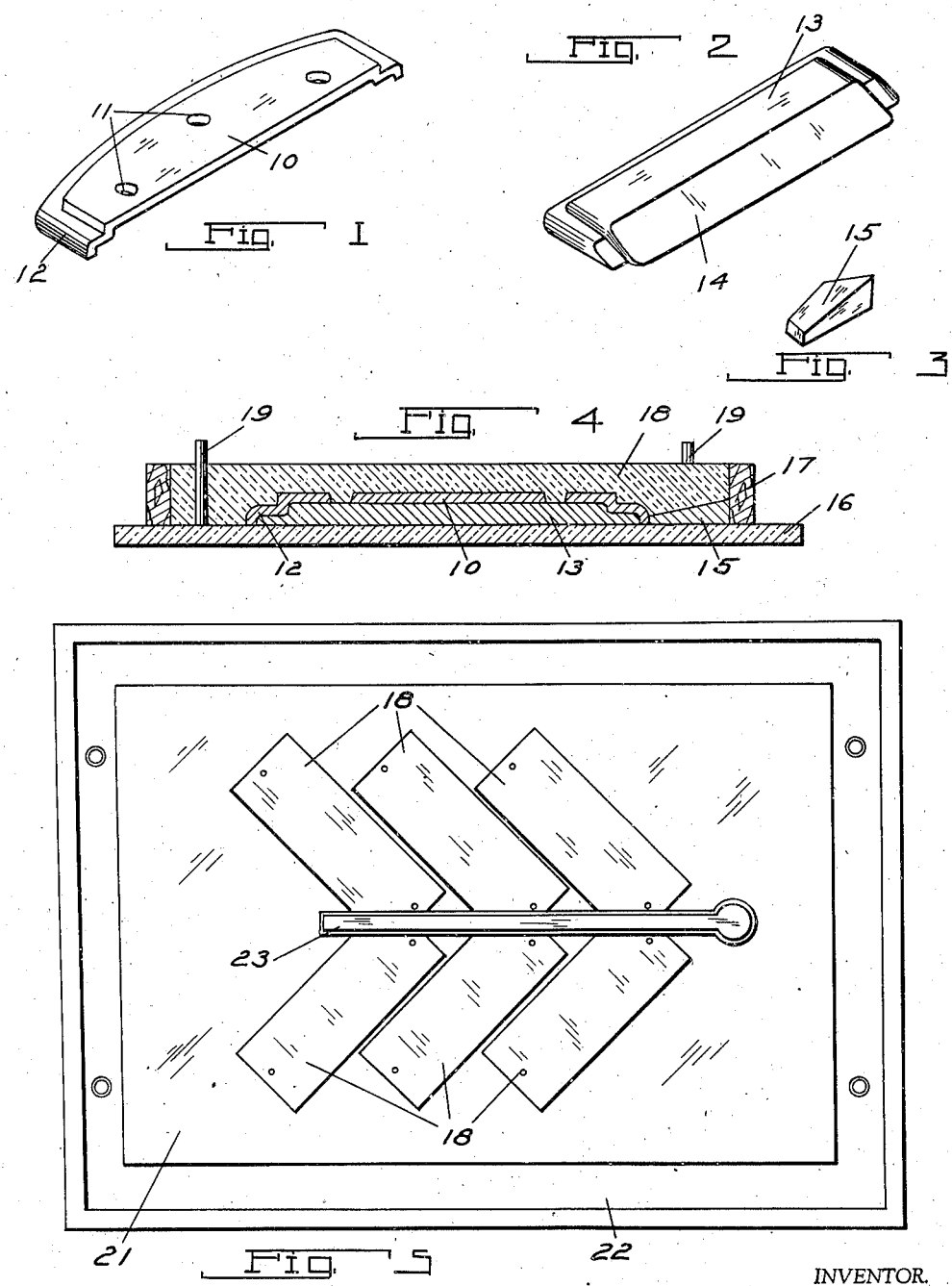
INVENTOR.
ANDREW C. DUNN
BY
McConkey & Booth
ATTORNEYS.

Oct. 7, 1941.  A. C. DUNN  2,258,579
ELECTROFORMING METHOD OF MAKING MOLDS
Filed Nov. 20, 1936  4 Sheets-Sheet 2

INVENTOR.
ANDREW C. DUNN
BY McConkey & Booth
ATTORNEYS.

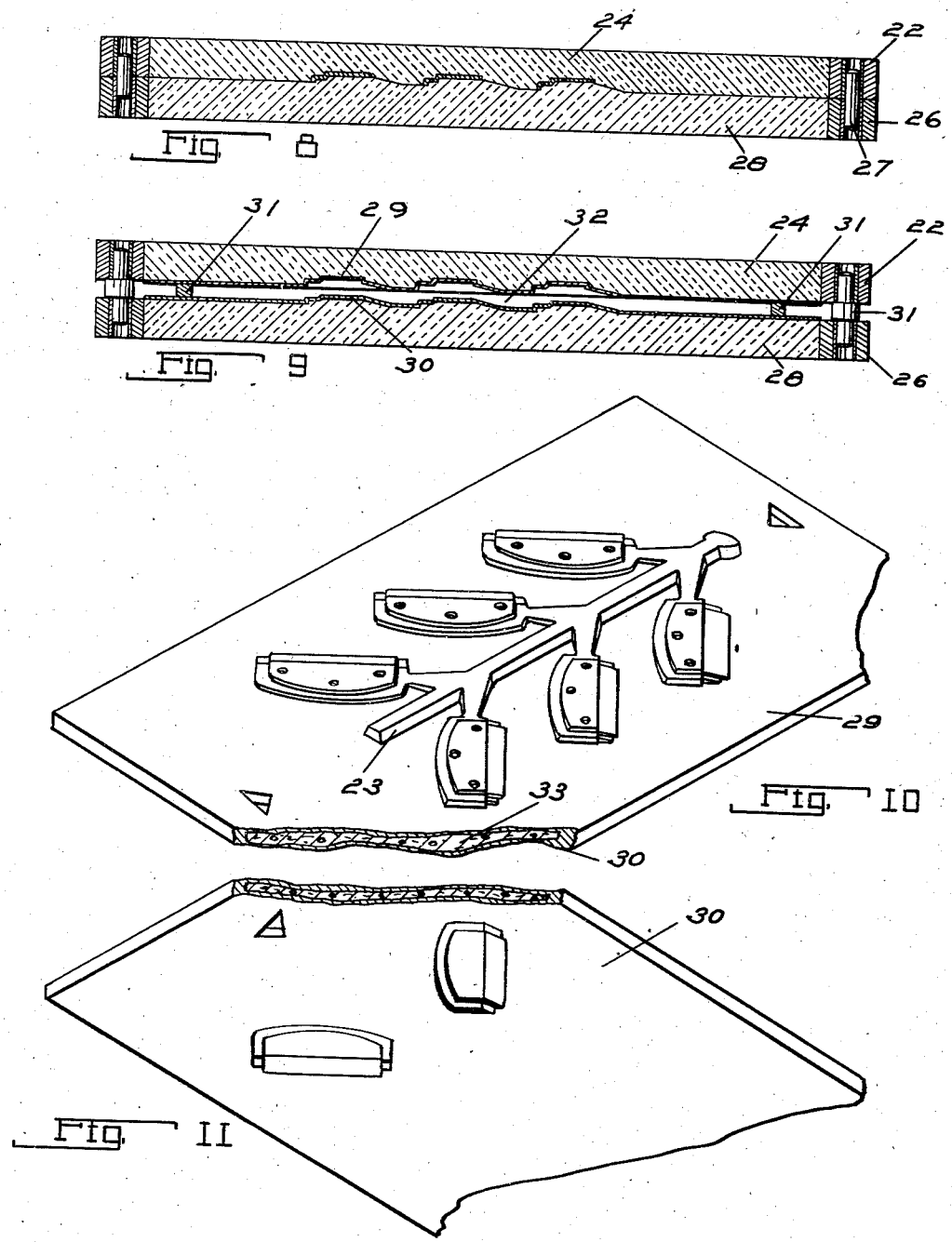

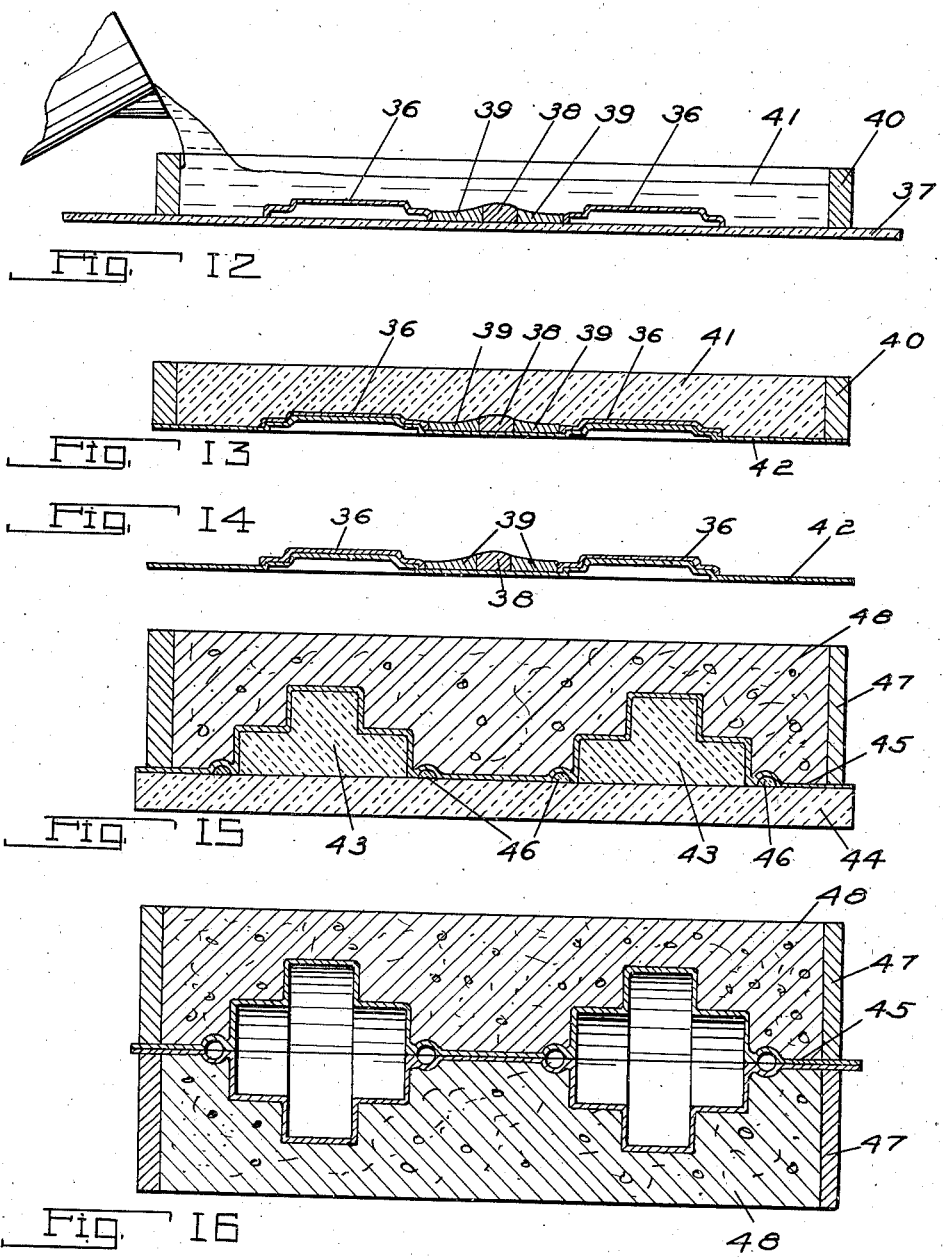

UNITED STATES PATENT OFFICE 2,258,579

ELECTROFORMING METHOD OF MAKING MOLDS

Andrew C. Dunn, Chicago, Ill.

Application November 20, 1936, Serial No. 111,869

4 Claims. (Cl. 204—6)

This invention relates to molds to be used as patterns for casting in sand or the like or for direct molding of plastic material such as rubber and to the method of making such molds.

One of the objects of the invention is to provide a novel method of making molds in which substantially all hand work is eliminated and in which an extremely accurate mold may be formed quickly and easily. This is preferably accomplished by shaping wax to conform to the article to be made and electroplating over the wax. The electroplate, suitably reinforced, forms the mold.

Another important feature of the invention relates to the reinforcement of the electroplates. Preferably a plaster is employed which can be applied to the electroplate substantially at room temperature so that there will be no warping or shrinkage to distort the electroplate. Instead of plaster, rubber or the like may be used if desired, the low temperature at which it is cured being insufficient to warp or shrink the electroplate.

Other objects and advantages of the invention relate to the novel molds and to various other novel features of the method of making them as will appear more fully from the following description when read in connection with the accompanying drawings, in which:

Figure 1 is a perspective view of an article to be cast;

Figures 2 and 3 are perspective views of core members;

Figure 4 is a section through a wax mold;

Figure 5 is a plan view of a molding frame;

Figures 8 and 9 are sections illustrating further steps in the making of matchplates;

Figures 10 and 11 are perspective views of a completed matchplate;

Figures 12, 13 and 14 are sectional views illustrating various steps in a modified method of making molding plates; and Figures 15 and 16 are sections illustrating various steps in the making of molds for plastic or like material.

Figure 6:
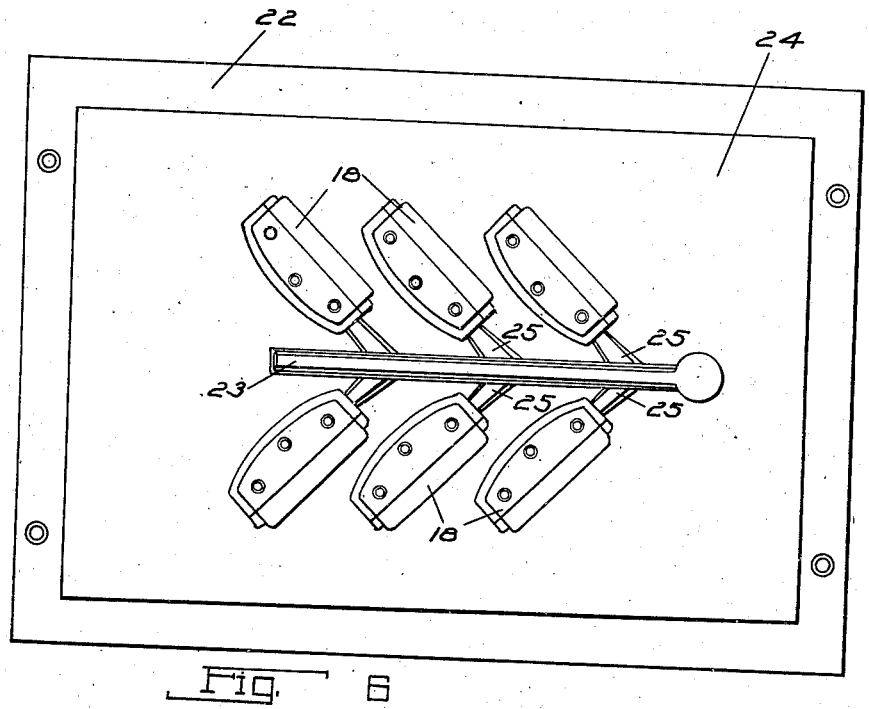
Figure 6 is a bottom view of the frame of Figure 5.

The article illustrated in Figure 1 is a mounting bracket for a door closer and includes a flat top 10 having a plurality of screw holes 11 therein and carried by a curving base portion 12. It will be understood that this article has been selected purely for illustrative purposes and that the invention is equally applicable to articles of substantially any size or shape.

A core member 13 shown in Figure 2 is shaped from any desired material to fit the lower side of the bracket and is formed with a tapered portion 14 to project out the open side of the bracket. A similar core member 15, Figure 3, is provided to form a gate.

In carrying out the novel method the bracket is placed over the core member 13 and both are laid on a flat plate 16, preferably of glass or the like. The core member 15 is placed in a position abutting the bracket and a frame 17 is laid on the plate 16. The exposed surfaces of the plate, the bracket and the core members are then coated with a parting material which may be the parting solution more particularly described and claimed in my copending application Serial No. 111,870, filed November 20, 1936, and molten wax 18 is poured thereover to fill the frame 17. Preferably dowel pins 19 are placed in the wax to form guide openings for a purpose to appear later.

After the wax 18 has hardened, which operation may be speeded up by refrigeration if desired, it is removed from the frame 17 and from the bracket and core members. Thus there is formed a block of wax 18 having one surface impressed to conform to one side of the bracket 10. As shown herein six such blocks 18 are formed although any desirable number could be made and used as will be apparent.

The six blocks 18 are laid on a flat plate of glass or the like 21 with their impressed sides down and an open top frame 22 is laid on the plate 21 around the blocks. A runner 23 of copper or the like is laid on the plate between the blocks 18 which butt up against the runner so that it will serve to close the openings formed by the core members 15. With all of the parts in place as described, molten wax is poured into the frame 22 to bind together the blocks 18 and the runner 23 in one large block of wax as shown at 24 in Figure 8.

According to one novel method, the impressions of the gates 15 in the wax block 24 as shown at 25 in Figure 6 are filled with some suitable material such as soft plaster and the hollow runner 23 is similarly filled to present a smooth surface. A plurality of replicas of the bracket to be cast are then placed in the impressions 18 and the whole exposed surface is coated with parting solution. These replicas may be metal duplicates of the pattern bracket or may be wax or plaster replicas thereof formed in any suitable manner.

A frame 26 is then placed on the frame 22, dowel pins 27 serving to aline the frames, and molten wax 28 is poured into the frame 26. Thus the wax block 28 receives a series of impressions of the lower side of the bracket 10 exactly matching the impressions of the upper side formed in the block 24. After the wax 28 has hardened the wax blocks 24 and 28 are separated, the plaster is removed from the gate impressions 15 and runner 23 in block 24 and the impressed surfaces of both blocks are electroplated in any well known manner to form electroplates 29 and 30 as shown in Figure 9.

After the electroplating is completed, the frames 22 and 26 are arranged face to face as shown in Figure 9 with suitable spacers 31 holding them in spaced relationship and the space 32 between the electroplates is filled with plaster. When the plaster sets, the edges of the electroplates are trimmed off and are preferably soldered together to form the completed matchplate shown in Figures 10 and 11. It will be noted that in these figures the electroplates 29 and 30 are joined together and are reinforced by plaster 33, the plaster itself being further reinforced by the use of wire screening or the like, not shown, to increase its strength.

According to a variation of the method described above, the blocks 24 and 28 may be separated by spacers prior to electroplating and the space between them may be filled with plaster. After the plaster has set the blocks 24 and 28 may be removed and the surface of the plaster electroplated to provide it with a hard, smooth surface. When this procedure is followed, the electroplate is preferably made very thin and serves primarily to form a hard, smooth surface on the plaster.

Figure 7:
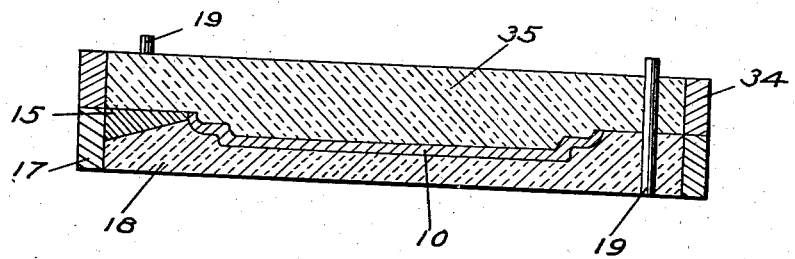
Figure 7 is a cross-section similar to Figure 4 illustrating a step in one method of forming a matchplate according to the invention.

Figure 7 illustrates one step in an alternative, and perhaps preferable, method of forming the matchplate in which the plate 16 and the core 13 are removed from the block 18 as shown in Figure 3, leaving the bracket 10 and gate core 15 in place therein. The exposed surfaces are coated with parting material and a frame 34 is placed on the frame 17 and filled with wax 35, the dowel pins 19 first being pushed through the block 18 to extend into the wax 35 or being replaced by longer pins. In the same manner a matching block 35 is made for each block 18 and the blocks 18 are then cast into a single block 24 as illustrated in Figures 5, 6, and 8 and as described above.

When the block 24 is formed, the blocks 35 are placed in proper position on the matching blocks 18 by means of the dowel pins and are covered with wax to form a single wax block similar to the block 28. Thereafter the remainder of the process is the same as that described above to form the completed matchplates.

With both processes it will be noted that the metal runner 23 is left in place and that the plating will adhere thereto so that it forms a substantially integral part of the electroplate 29. It will also be noted that a very accurate matchplate will be quickly and easily formed with substantially no hand work. The process as last described permits any number of matchplates or molds to be made with a single pattern without the necessity for making wax or other replicas thereof and also eliminates the necessity for filling the impressions of the gate cores with plaster or the like in forming the second wax block as in the case of the first described process.

Figures 12 to 14 illustrate an alternative method of forming a plate similar to the plate 29 which is particularly useful when a number of metal patterns or replicas of the article to be cast are available. According to this method a number of the replicas 36 are laid on a plate of glass or the like 37 with a metal runner 38 connected thereto by metal gates 39. A frame 40 is then placed on the plate and filled with molten wax 41 to bind the replicas, gates and runner together. Thereafter the plate 37 is removed and the exposed surface is plated to form an electroplate 42 which adheres to and rigidly connects the replicas 36, the gates 39 and the runner 38. When the wax and the frame 40 are removed a completed plate is formed as shown in Figure 14 which may be used as shown or which may be suitably reinforced.

Instead of using wax as described above to receive impressions of the articles to be molded, I have found that plaster can be used equally well and in some cases is preferable since it is subjected to less shrinkage upon setting than wax. I have also found that with plaster it is not necessary to coat the pattern with parting solution, particularly if it is clean, but where plaster contacts plaster as in pouring the bottom half of the mold parting solution is essential.

When plaster is used it is made up into a thin solution which is poured in exactly the same manner as the wax described above and is allowed to set, the setting action being speeded up if desired by the use of a drying oven. After the plaster has set the impressed surface is washed to remove any remaining parting solution and is thinly coated with varnish or lacquer which is preferably sprayed on. The varnish is allowed to dry to a tacky state and is then rubbed with molding lead or lampblack and polished by brushing with graphite to form a conducting surface for electroplating.

Various materials other than wax or plaster which can be poured in liquid form might be employed in lieu thereof, and it is intended that the term "plastic material" as employed in this specification and claims shall include all such materials.

Figures 15 and 16 illustrate the application of the invention to the manufacture of molds for plastic material, core boxes, core dryers and the like. For this purpose wax replicas 43 of the article to be molded are made, each replica simulating only one side of the article to a suitable parting line. These replicas are secured to a plate 44 of wax or the like and the plate and replicas are electroplated as indicated at 45. Where the molds are to be used for rubber or other plastic material a strip of wax 46 is preferably laid around each replica to form a cavity to receive excess material. A frame 47 is placed on the electroplate 45 and is filled with plaster 48 to form a reinforcing body. Since plaster is a rather poor heat conductor, metal filings or wires are preferably mixed therewith when the molds are to be used for rubber or other material which is cured by heat.

After the plaster 48 has hardened the wax is removed and, if desired, the electroplate 45 may be replated with chromium to provide a hard smooth surface. It will be understood that pairs of mating molds are formed as shown in Figure 16 which may be used in place of the usual molding dies.

Instead of using plaster to reinforce the electroplates, other material which may be applied and caused to harden without excessive heat may be employed. Thus raw rubber could be applied to the electroplates and cured in place, the relatively low temperature required to cure the rubber not being sufficient to cause warping or shrinking of the electroplates.

While several embodiments of the invention have been shown and described in detail, it is not intended to limit the scope of the invention thereto or otherwise than by the terms of the appended claims.

I claim:

1. The method of making molds comprising placing a plurality of molds on a plate, pouring plastic material over said molds to bind them together, removing the plate, electroplating the surface of said molds and said material to form a single electroplate, reinforcing said electroplate with plaster, and removing the plastic material.

2. The method of making matchplates comprising forming a plurality of impressions of one side of an article to be cast in a block of plastic material, placing replicas of said article in the impressions, coating the exposed surfaces of said replicas and said block with parting material, pouring plastic material over said exposed surfaces, to form a second block having matching impressions of the other side of the article, electroplating the impressed surfaces of the blocks, and connecting the electroplates.

3. The method of making matchplates comprising forming a plurality of blocks of plastic material with impressions of one side of an article to be cast, placing said blocks on a plate, pouring plastic material over said plate and blocks to bind the blocks together, placing replicas of said article in the impressions, coating the exposed surfaces of the replicas and the block with parting material, pouring plastic material over said exposed surfaces to form a second block having matching impressions of the other side of the article, electroplating the exposed surfaces of the blocks, and connecting the electroplates.

4. The method of making matchplates comprising forming a plurality of blocks of plastic material with impressions of one side of an article to be cast, placing said blocks on a plate, placing a metallic runner on the plate adjacent the blocks, pouring plastic material over the blocks and runner to bind them together, electroplating over the runner and the impressed surfaces of the blocks to form a singe electroplate integrally bonded to the runner and shaped to conform with the impressed surfaces of the blocks, forming a second block having matching impressions of the other side of the article, electroplating said second block, and securing the electroplates together.

ANDREW C. DUNN.